Figure 1:
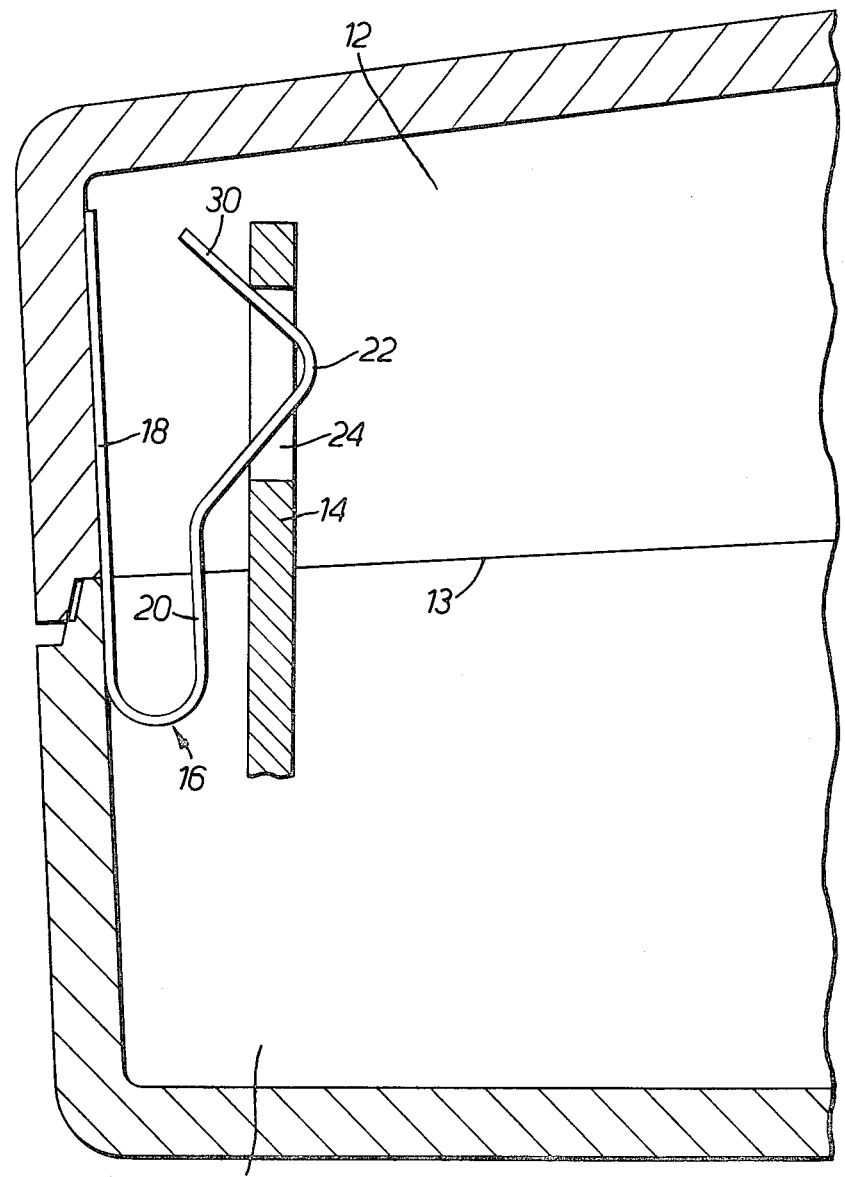

United States Patent [19]

Hickling

[11] Patent Number: 4,462,142

[45] Date of Patent: Jul. 31, 1984

[54] FASTENERS

[75] Inventor: David J. Hickling, Chilwell, England

[73] Assignee: Plessey Overseas Limited, Ilford, England

[21] Appl. No.: 387,346

[22] Filed: Jun. 11, 1982

[30] Foreign Application Priority Data

Jun. 12, 1981 [GB] United Kingdom ............... 8118220

[51] Int. Cl.³ .............................................. A44B 13/02
[52] U.S. Cl. ..................................... 403/329; 24/618;
292/76; 220/324
[58] Field of Search ..... 24/230 TC, 230 AP, 230 AS,
24/230 AT, 263 SB, 263 B, 3 J, 3 L, 213 R, 213
B; 292/17, 76; 403/326, 327, 329; 220/323, 324

[56] References Cited

U.S. PATENT DOCUMENTS

| 1,945,348 | 1/1934 | Farr | 292/76 |
| 2,065,908 | 12/1936 | Pihl | 292/76 |
| 2,353,796 | 7/1944 | Tinnerman | 411/520 |
| 2,407,459 | 9/1946 | Stieglitz | 292/76 |
| 2,605,926 | 8/1952 | Casey | 220/31 |
| 2,628,738 | 2/1953 | Hilldale | 220/234 |
| 2,698,472 | 1/1955 | Knohl | 24/295 |
| 2,761,188 | 9/1956 | Bedford, Jr. | 24/213 B |
| 2,839,805 | 6/1958 | Bedford, Jr. | 24/84 |
| 2,947,048 | 8/1960 | Ellis | 24/291 |
| 3,194,623 | 7/1965 | Burgess | 312/333 |
| 3,536,348 | 10/1970 | Tedesco | 292/76 |
| 4,220,252 | 9/1980 | Beall et al. | 220/307 |

FOREIGN PATENT DOCUMENTS

| 835535 | 4/1952 | Fed. Rep. of Germany . |
| 1891680 | 2/1964 | Fed. Rep. of Germany . |
| 1500889 | 6/1969 | Fed. Rep. of Germany . |
| 1575242 | 11/1969 | Fed. Rep. of Germany . |
| 1275182 | 4/1966 | France . |
| 450641 | 7/1936 | United Kingdom . |
| 1277607 | 6/1972 | United Kingdom . |

OTHER PUBLICATIONS

American Cabinet Hardware Corp Ad, 6-10-38.

Primary Examiner—Gene Mancene
Assistant Examiner—David L. Tarnoff
Attorney, Agent, or Firm—Fleit, Jacobson, Cohn & Price

[57] ABSTRACT

The invention relates to fasteners for two parts of a body which are wholly contained within the body and not visible when the two parts are joined.

The fastener comprises a resilient member secured inside the first part of the body projecting internally of the body and an orifice formed inside the second part of the body. The resilient member is shaped to enter the orifice and verge the two parts together and to permit separation of the two parts by a relative pivoting movement adjacent to the obutting joint between the parts whereby the resilient member is retracted from the orifice.

3 Claims, 3 Drawing Figures

FASTENERS

This invention relates to fasteners and more particularly to fasteners for two parts of a body where it is required that no securing means is normally visible externally of the body. Such an example is a styled subscribers telephone apparatus made of two or more parts having visible joining lines between the parts, and external fastening arrangements would spoil or otherwise mar the appearance of the telephone.

It is an object of the present invention therefore to provide a fastener for two parts of a hollow body which is wholly contained within the body when the two parts are secured together, although the use of further fastening means for the two parts is not excluded.

According to the present invention a fastener for two parts of a hollow body comprises a resilient member secured internally to a first part of the hollow body and projecting inwardly thereof and an orifice formed internally of a second part of the hollow body, the resilient member being shaped to enter the orifice and to urge the two parts together to form a coplanar surface of the first and second parts of the hollow body and to permit separation of the two parts by a relative pivoting movement adjacent to the abutting joint between the parts whereby the resilient member is retracted from the orifice. The resilient member preferably comprises a substantially V-shaped strip, the apex of the V projecting inwardly of the first part. Preferably it comprises a substantially U-shaped strip one of the legs of the U-shape being straight and the other leg having a substantially V-shaped portion formed therein, the straight leg being adapted to be secured to the inner surface of the first part.

The orifice may be formed in a flange formed inside the second part of the body and spaced from the wall of the second part and extending into the first part. Alternatively the orifice may be formed in a detachable web or other member removably mounted in the second part of the body and extending into the first part of the body.

Figure 2:
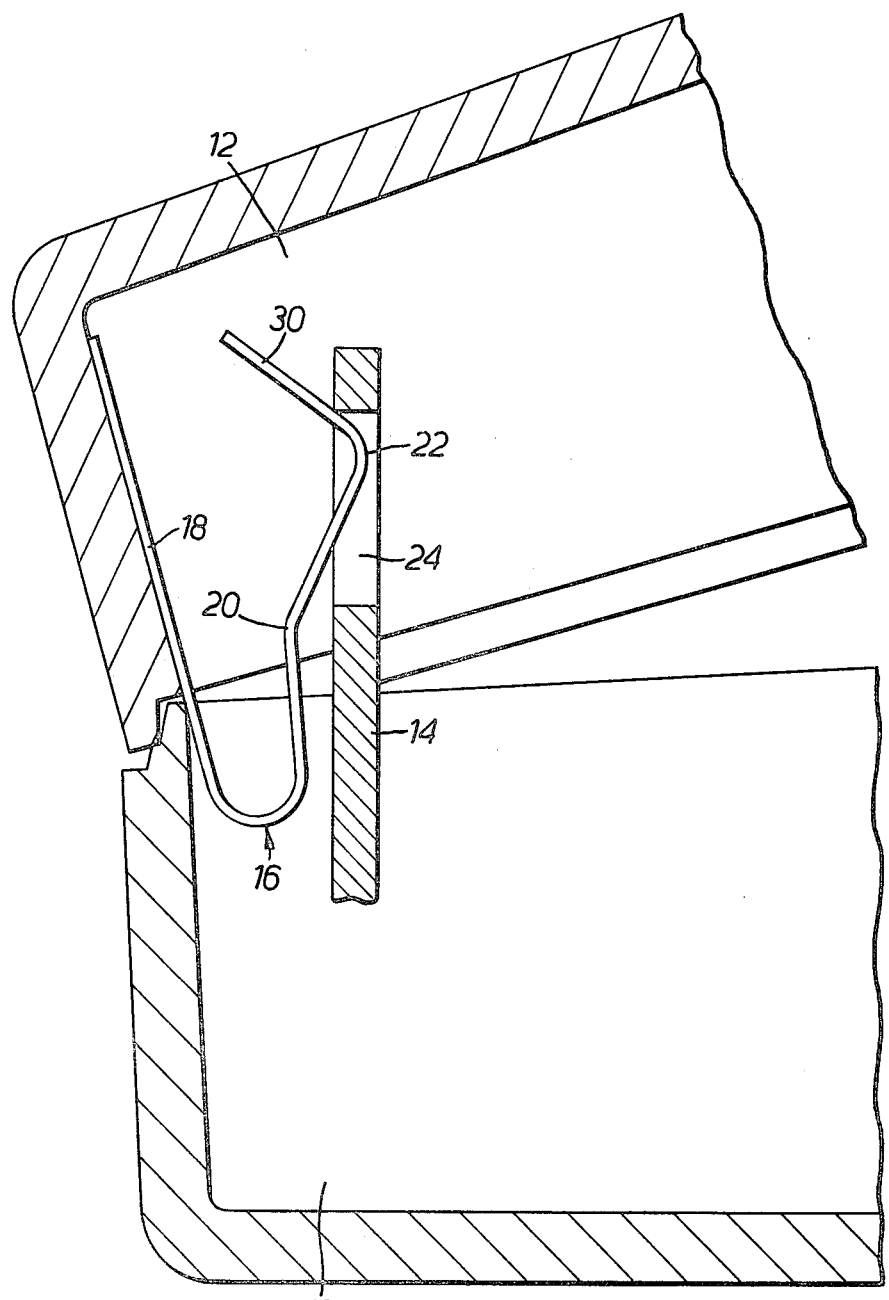
Figure 3:
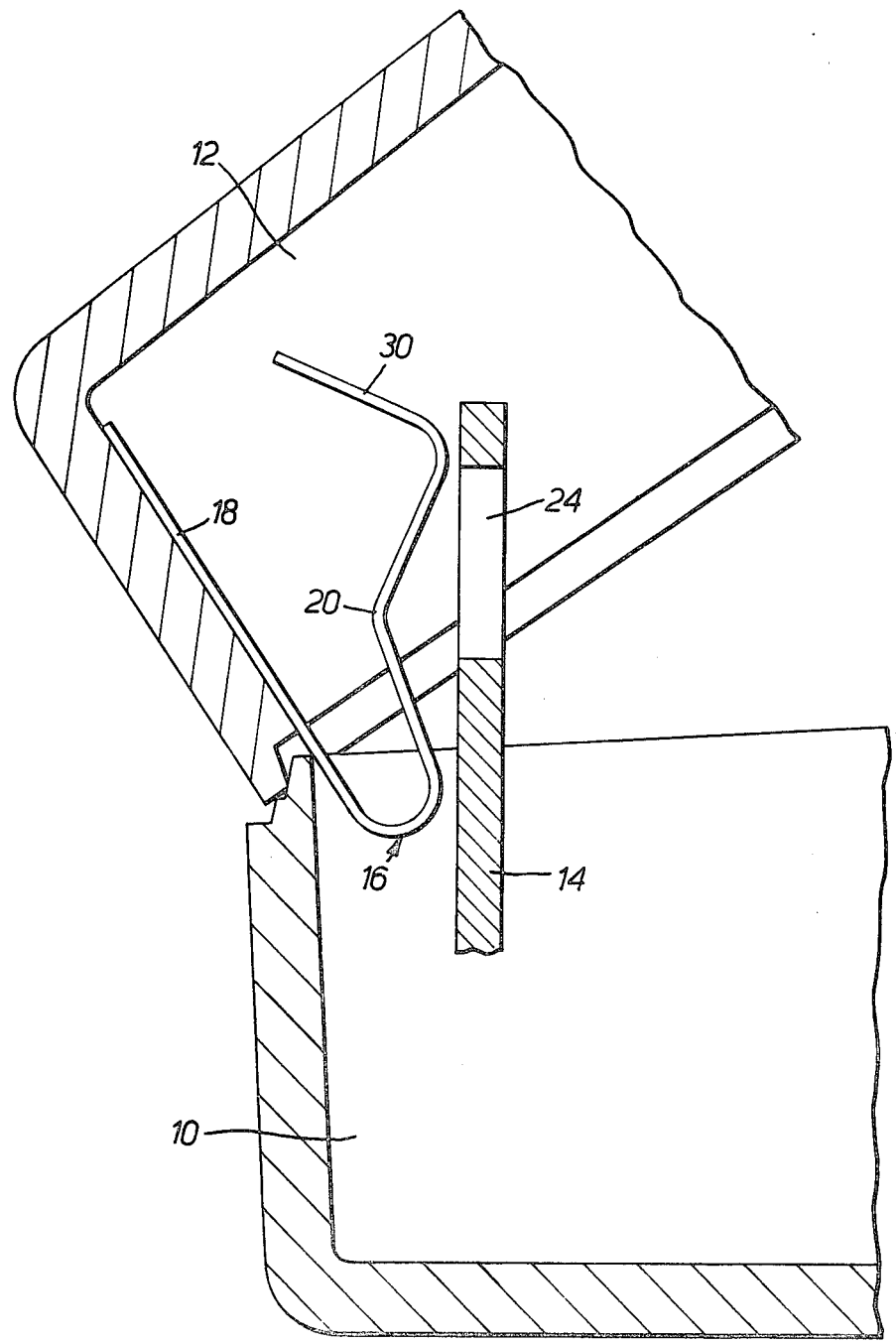

An embodiment of the invention will now be described by way of example only with reference to the accompanying drawings in which FIG. 1 is a cross-sectional view through a portion of a hollow body having a fastener in accordance with the present invention, FIG. 2 is a cross-sectional view showing the fastener in a partially engaged position and FIG. 3 is a cross-sectional view through the body showing the fastener in a disengaged position.

The figures show a portion of a hollow body having a lower base part 10 and an upper cover part 12 which may be any type of mechanism such as, for example, a subscribers telephone apparatus. The base 10 is adapted to contain the basic mechanism and circuitry of the telephone which is mounted on a separate chassis, part 14 of which is shown, the chassis being suitably secured inside the base 10. The telephone dial or push button module, handset contacts, etc. are adapted to project through the holes formed in the cover 12, the joint 13 between the cover and the base being positioned about half-way up the body and hence being normally visible.

The base and the cover are secured together at one end by a suitable nut and bolt arrangement (not shown) and at the other end by a fastener according to the invention.

The fastener comprises a spring steel strip 16 bend into a substantially U-shape with one straight leg 18 and one leg 20 formed substantially into a V-shape. The straight leg 18 is adapted to be secured to the inside of the cover 12 either by bonding, fitting into slots or any other suitable means so that the apex 22 of the V-shape formed in the other leg 20 projects inwardly of the cover 12 and contained within the cover 12. Further, the U-shape portion extends into the base 10 and adjacent to the edge thereof.

A hole 24 is formed conveniently in the chassis 14 which is spaced from the end of the base 10 so that the V-shaped leg of the spring steel strip 16 projects into it. In the position shown in FIG. 1 the leg 20 is urged towards the other leg 18 and the V-shaped leg 20 is urged downwards by the reaction between the top edge of the hole 24 and the end 30 of the leg 20. This arrangement thus forces the cover 12 down on to the base 10 and the cover 12 cannot be vertically removed from the base 10 unless an excessive force is applied upwardly to the cover 12 such as by prising a suitably thin tool into the joint 13 which would normally result in breakage or deformation of the cover and/or the base.

To remove the cover 12, the nut and bolt assembly is removed and the cover pivoted along the joint between the cover 12 and the base 10 as illustrated in FIG. 2. This pivoting movement causes the end 30 of the leg 20 to slide out of the hole 24 in the chassis 14 until the whole of the V-shaped leg 20 is withdrawn from the hole 24 (see FIG. 3). The cover 12 can now be simply lifted off the base 10.

Fitting the cover 12 is the same procedure in reverse. The cover 12 is placed at the angle shown in FIG. 3 so that the spring 16 just clears the chassis 14. As the cover is pivoted downwards the V-shaped leg 20 of the spring 16 enters the hole 24 and the end 30 slides over the top edge of the hole 24 until the position shown in FIG. 1 is reached.

The fastener is thus hidden inside the hollow body and does not interfere with the external styling of the body. Furthermore the fastener is secure in that it cannot be released without the pivoting action, and all that is required in a reasonably symmetrical shaped body is a single nut and bolt at the opposite end to the fastener. Such a nut and bolt could easily be hidden under a name plate or other cover member.

What I claim is:

1. A fastener for a first and a second part of a hollow body, each of said parts having an edge about which said parts are relatively pivotable, said edges abutting when said first and second parts are secured together and forming a coplanar surface of said first and second parts, said fastener comprising a resilient elongate strip including a substantially U-shaped strip having two legs and a U-shaped portion, one of the legs being straight and secured internally of said first part adjacent to said edge thereof, said U-shaped portion extending into said second part and adjacent to an edge thereof, said elongate strip further including a substantially V-shaped portion formed therein, said V-shaped portion projecting inwardly of and contained in said first part, a member attached internally of said second part spaced from said edge thereof and an orifice formed in said member so as to be contained within said first part, said orifice being shaped to receive said V-shaped portion of said elongate strip to locate said elongate strip, said V-shaped portion entering into said orifice when said edges are abutted and said first part is pivoted about said abutting edges towards said second part and said V-shaped portion retracting from said orifice when said edges are abutted and said first part is pivoted about said abutting edges away from said second part, said resilient elongate strip urging said first and second parts together when said V-shaped portion enters said orifice and said first part is pivoted towards said second part.

2. A fastener as claimed in claim 1 in which said orifice is formed in a flange formed inside said second part of said hollow body.

3. A fastener as claimed in claim 1 in which said orifice is formed in a detachable web or other member removably mounted in said second part of said hollow body.

* * * * *